United States Patent [19]

Andrieu et al.

[11] Patent Number: 5,178,923

[45] Date of Patent: Jan. 12, 1993

[54] WRAPAROUND CLOSURE DEVICE

[75] Inventors: Hubert Andrieu; Daniel G. Caudron, both of Crepy-en-Valois, France; Harry F. Gladfelter, Phoenixville; Marie C. Tresslar, Jeffersonville, both of Pa.; Denis H. T. Van Wassenhove, Crepy-en-Valois, France

[73] Assignee: Textilver S.A., Crepy-en-Valois, France

[21] Appl. No.: 819,088

[22] Filed: Jan. 9, 1992

[51] Int. Cl.$^5$ .............................. B32B 23/02
[52] U.S. Cl. .................. 428/36.1; 428/36.3; 428/100; 428/192; 428/193
[58] Field of Search ............ 428/192, 193, 100, 36.1, 428/36.3

[56] References Cited

U.S. PATENT DOCUMENTS

| | | | |
|---|---|---|---|
| 3,413,406 | 11/1968 | Plummer | 174/3 |
| 4,281,211 | 7/1981 | Tatum et al. | 174/36 |
| 4,371,578 | 2/1983 | Thompson | 428/100 |
| 4,684,762 | 8/1987 | Gladfelter | 174/36 |
| 4,784,886 | 11/1988 | Monget et al. | 428/36 |
| 4,791,236 | 12/1988 | Klein et al. | 428/100 |
| 4,891,256 | 1/1990 | Kite, III et al. | 428/36 |

Primary Examiner—James J. Bell
Attorney, Agent, or Firm—Synnestvedt & Lechner

[57] ABSTRACT

Wraparound sleeves formed by weaving, knitting or braiding for the protection of elongated articles, such as cables and hoses, are disclosed. The tubes are provided with closure means comprising multifilament, bulky yarn interlaced along one marginal edge of the sleeving material and of Velcro hook tape or other hook type elements disposed along the other marginal edge. In one embodiment of the invention, the interlaced multifilament, bulky yarn is disposed along both marginal edges with the Velcro tape fastened to one side of the bulky yarn on one marginal edge. Intermediate bands or rows of multifilament yarn may be provided so that to accommodate bundles of irregular cross-sectional tape. When the sleeving material is provided in rolls, the hooks on one side of the web interengage with the bulky multifilament yarn surface exposed on the other side of the web so that the web is held in rolled up form except when deliberately unwrapped.

14 Claims, 3 Drawing Sheets

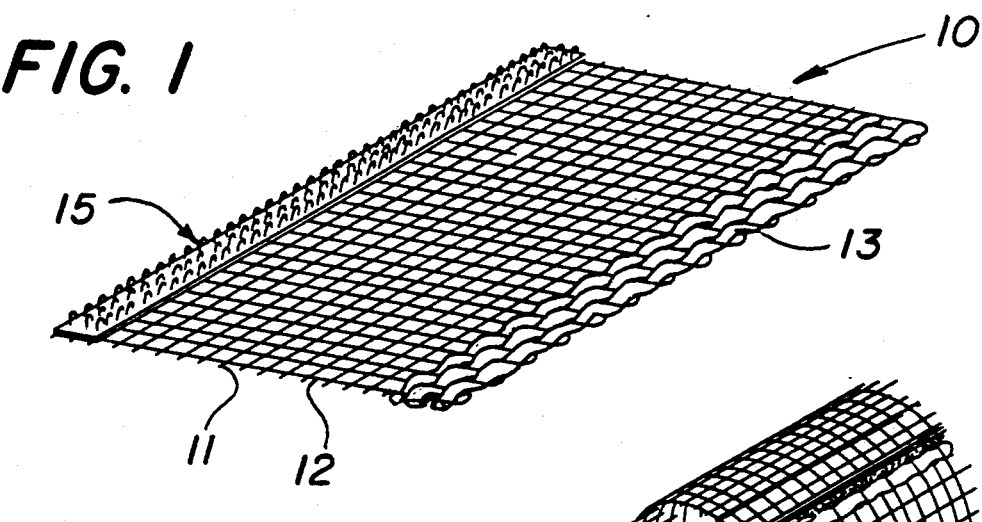
FIG. 1
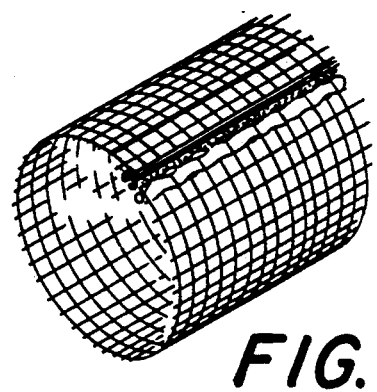
FIG. 2
FIG. 3
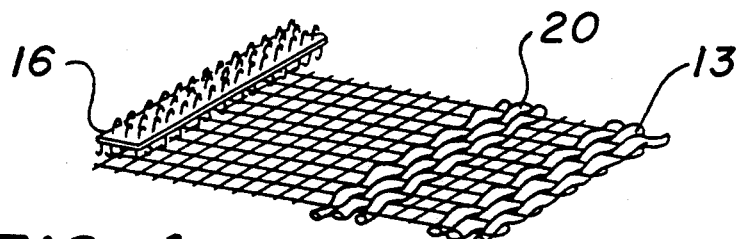
FIG. 4
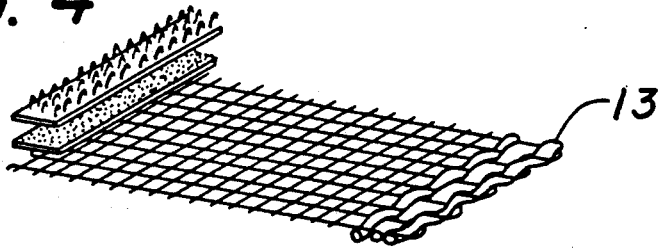
FIG. 5
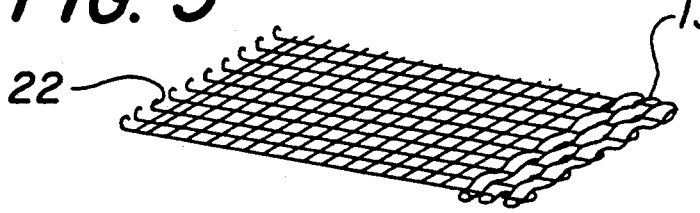
FIG. 6
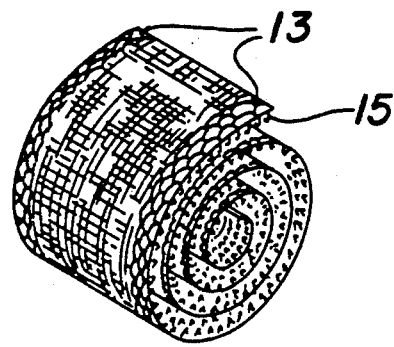

WRAPAROUND CLOSURE DEVICE

FIELD OF THE INVENTION

This invention relates to wraparound fabric sleeves formed by weaving, knitting or braiding. More particularly, the invention relates to wraparound sleeves having a closure device and more specifically to wraparound sleeves for the protection of elongated articles, such as cables wherein the sleeves are intended to provide protection from the effects of abrasion or heat as well as to maintain the elongated articles in a neatly bundled arrangement so that they are not damaged by moving machinery parts or the like.

BACKGROUND OF THE INVENTION

The use of flexible sleeves for the protection of cables, hoses and other elongated articles for the purposes above noted is well known. In addition, it is well known to secure the marginal edges of the sleeving material together by means of zipper type fastener elements. A product for this purpose is a sleeve formed of braided monofilament secured together by a zipper type fastener element. Such sleeving is sold by The Bentley-Harris Manufacturing Company under the trademark EXPANDO ZIP and is widely used in automotive as well as other applications, for example, for bundling cables and hoses and the like in an automobile or truck engine compartment. Other types of sleeving available from The Bentley-Harris Manufacturing Company are woven, knitted or braided from materials such as monofilaments of engineered plastic materials, glass fiber, wire and bulky yarns and combinations thereof, depending upon the requirements of the particular application. In addition, other means of fastening sleeves of the type disclosed are known in the art. In addition to the use of zipper type fasteners, these include tongue and groove type elongated flexible plastic fasteners, velcro tapes exposed along the marginal edges of the sleeving material, tape wraps and wire or tape ties. Despite the availability of the foregoing, the need exists for a simple and reliable, relatively low cost system, for closure of a sleeve which will accommodate variations in the diameter of a bundle of elongated articles, such as cables having connectors intermediate their length, while allowing for cable breakouts at points where a cable is required to be connected to a particular instrument or item of equipment.

SUMMARY AND OBJECTS OF THE INVENTION

In accordance with the invention, a ribbon or web of sleeving material is provided, the sleeving material being comprised of interlaced monofilaments and/or multifilament material, the ribbon or web having at least one marginal edge comprised of bulky multifilament yarn which is exposed on both the web inner and the outer surface, and hook type fastener elements extended along the opposite marginal edge of the web, the hook type fastener elements being interengageable with the bulky yarn for closure of the sleeve around the elongated articles. Advantageously, the hook type fasteners are provided as a tape of the kind sold under the trademark VELCRO. The tape is sewn or adhesively bonded to the web along the edge thereof with the hook elements facing generally inwardly. Alternatively and advantageously, the individual monofilaments comprising the sleeve may be directly formed into individual hook elements for interengagement with the bulky yarn.

In a preferred form of the invention, the sleeving material is formed of woven monofilaments with at least one band or row of bulky multifilament yarn interwoven along at least one marginal edge of the sleeve, each said row comprising one or a plurality of bulky multifilament yarns. In yet another form of the invention, additional rows of bulky multifilament yarns are provided at spaced locations intermediate the marginal edges to allow for interengagement of the hooks with a select row of yarn according to the diameter of the articles being protected.

In accordance with the foregoing, important objectives of the present invention include the following:

the provision of a wraparound sleeve with fastening means formed integrally of the wraparound sleeve material;

the provision of fastening means for a wraparound sleeve which eliminates the need for taping or tieing;

the provision of a fastening means for a special tool for fastening the sleeve edges together.

A still further objective of the invention is the provision of a wraparound sleeve having fastening means which allows for considerable variation in the overall size of the elongated article or articles being protected.

A still further objective of the invention is the provision of a wraparound sleeve material supplied to the end user in rolls wherein the fastener means serve to hold the web of material in rolled up form until required for use.

The foregoing as well as other objectives and advantages of the invention will become apparent from the following detailed description of the illustrative embodiment of the invention.

DETAILED DESCRIPTION OF THE DRAWINGS

FIG. 1 is a schematic view showing a wraparound sleeve having interengageable fastener elements formed according to the present invention;

FIG. 2 is a view of the wraparound sleeve of FIG. 1 showing the fastener elements interengaged;

FIG. 3 is a fragmentary view showing a modified form of the invention of FIG. 1;

FIG. 4 is a view similar to FIG. 3 showing a further alternative of the invention;

FIG. 5 illustrates a still further alternative of the invention;

FIG. 6 illustrates a supply of sleeving in rolled up form ready for installation;

DETAILED DESCRIPTION OF THE ILLUSTRATIVE EMBODIMENT OF THE INVENTION

Figure 9:
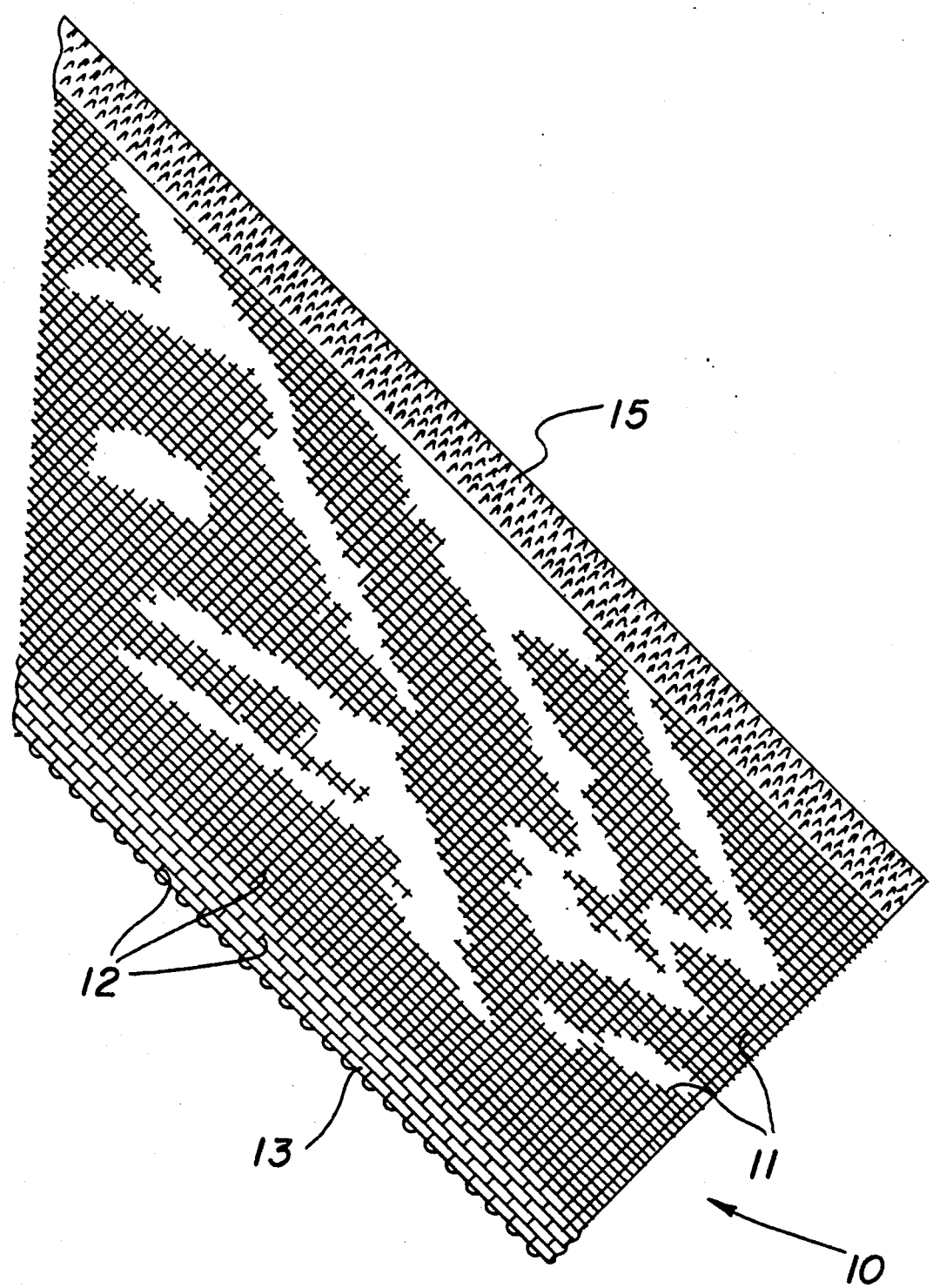
FIG. 9 is a view similar to FIG. 1 illustrating a woven monofilament sleeve incorporating the principles of the invention.

Referring first to FIGS. 1 and 9, a sleeving material 10 comprised of interlaced warp and weft monofilaments 11 and 12 is disclosed. Typically, the monofilaments are formed of an engineered plastic material. Preferably, the monofilament used is polyester, which is economical, has good durability and is relatively abrasion resistant, but it will be appreciated that other members of the family of plastics known as engineered plastics are suitable for use in sleeves formed according to the present invention.

Materials in the family of engineered plastics of the type referred to herein include plastics that have a tensile modulus of greater than 50,000 psi and in the range from about 50,000 to about 200,000. Examples of engineered plastics are the olefin polymers of which are poly 4-methyl pentene and fluorinated polyolefins, ethylenetetrafluoroethylene copolymers and vinylidene fluoride polymers, especially polyvinylidene fluoride and blends thereof, for example, the fluorinated olefin blends as described and claimed in British Patent No. 1,120,131, polyesters, for example, polyethylene terephthalate, polytetramethylene terephathalate for example that are treated as described in U.S. Pat. Nos. 3,968,015, 4,073,830 and 4,113,594, polyphenyleneoxide and -sulphide, blends of polyethylene oxide with styrene, silicone carbonate block copolymers, polyketones, such as polyarylether ketones, for example, those described and claimed in U.S. Pat. Nos. 3,953,400, 4,024,314, 4,229,564, 3,751,398, 3,914,298, 3,956,146 and 4,111,908 and in British Patent Nos. 1,387,303 and 1,383,393, polysulphones, for example, polyaryl sulphones, polyarylethere sulphones, polyetherimides, for example those described in U.S. Pat. No. 3,847,867, polycarbonates, especially those derived from bis phenol-A, polyamides, especially those described and claimed in U.S. Pat. Nos. 3,551,200 and 3,677,921 and in British Patent No. 1,287,932, poly ether ether ketone (peek), epoxy resins and blends of one or more of the above-mentioned polymeric materials either with each other or with other polymeric materials. A more detailed discussion of the above materials is found in British Specification No. 1,529,351 which is incorporated herein by reference. It is especially preferred to use polyester as the monofilament material.

According to the invention, it is contemplated that the sleeves are made from fabric in ribbon or web form by shuttle loom, needle loom, scrim, fused lattice or braiding techniques. In addition, the objectives of the invention may be accomplished by knitting, braiding or weaving articles in tubular form and thereafter cutting the tube longitudinally so as to form a web of material used for manufacturing a sleeve.

A preferred form the of the invention utilizes sleeving material in woven form as best illustrated in FIGS. 1 and 9. Although the invention is illustrated in the production of sleeves having an open construction, which allows for good air circulation, certain applications of sleeves formed according to the invention as, for example, where insulating capability is required, will be formed utilizing a substantially closed construction. As is illustrated in FIG. 9, a typical construction is comprised of single monofilament warps and monofilament wefts. The monofilaments range in diameter from about 8 to 15 mils for typical automotive applications.

With reference to FIGS. 1 and 2, where a woven sleeve is disclosed, one longitudinal edge is provided with woven bulky monofilament yarn 13 interlaced with the weft monofilaments along one edge of the sleeve. Preferably, a plurality of multifilament yarns constitute a single band or row extending inwardly from the marginal edge. Each multifilament band or row may advantageously comprise 3 to 5 bulky multifilament yarns. As illustrated in FIG. 9, five multifilament yarns are woven in a band approximately ⅜" wide in place of the monofilament warps. The arrangement results in the exposure of the multifilament warp yarns on both sleeve surfaces which is of advantage for reasons which will become apparent from the following description.

Preferably, as best seen in FIGS. 1 and 9, hook means which may advantageously be in the form of Velcro hook tape 15 is secured along the marginal edge opposite to the edge having the woven multifilaments. As indicated in FIG. 1, the Velcro hook tape 15 may be sewn or adhesively secured directly to the monofilament web. Alternatively, multifilament warp yarns may be woven into each marginal edge in the form of bands or rows and, as shown in FIG. 3, Velcro hook tape having hooks on both surfaces as illustrated at 16 may then be applied with the Velcro hooks on the lower surface of the tape securing directly to the band of multifilament warp yarns adjacent one of the marginal edges.

Alternatively, an interlayer of tape 18 may be provided between the band of multifilament warp yarns and the Velcro hook tape, as is illustrated in FIG. 4. In this embodiment, the Velcro hook tape is advantageously adhesively secured to the intermediate tape layer.

If desired, additional bands or rows of multifilament warp yarns may be interwoven into the sleeving material, as is illustrated at 20 in FIG. 3, either as replacements for the monofilament warps or in bands between the monofilament warps. The use of a plurality of bands of multifilament yarn allows for variation in the overlap of the sleeving material so that variations in the sizes of the substrates being protected can be accommodated.

FIG. 5 illustrates a further embodiment of the present invention. According to FIG. 5, the ends of the weft monofilaments are first cut and then crimped or bent and heat set into a hook shaped form as at 22 thereby eliminating the need for the separate step of application of the Velcro hook tape. Conventional machinery for forming polyester and like kinds of monofilament into hook type fastening elements may be used for the fabrication of hooks along one marginal edge of the product.

Various advantages are realized through the use of bulky monofilament yarn extended along the same edge of the web as the hook shaped fastener elements when the multifilament yarn is interwoven or interlaced into the web. An advantage of this can be seen upon reference to FIG. 6 which shows the sleeving material in rolled up form ready for use. As illustrated in FIG. 6, when the material is rolled up, the Velcro hooks on one side of the web interengage with the bulky multifilament yarn surface exposed on the other side of the web, thereby yieldably holding the web in the rolled up form except when the web is deliberately unwrapped. This feature maintains the roll in compact form and allows for the installer to unwrap only that amount of web material actually required for use while maintaining the unused web in compactly wrapped up form. Another advantage of providing the interlaced multifilament warp yarn is that the sleeving may be fastened alternatively in the overlapping relationship shown in FIG. 2 wherein an inside surface on one edge of the sleeve is overlapped with the outside surface on the other edge of the sleeve as is shown in FIG. 2. However, in some applications it may be of advantage to close the sleeve with both inside surfaces interengaged by the fastening means so that the sleeve in cross-section has a "tadpole"

shape. Either arrangement may be conveniently utilized with the present invention.

Figure 7:
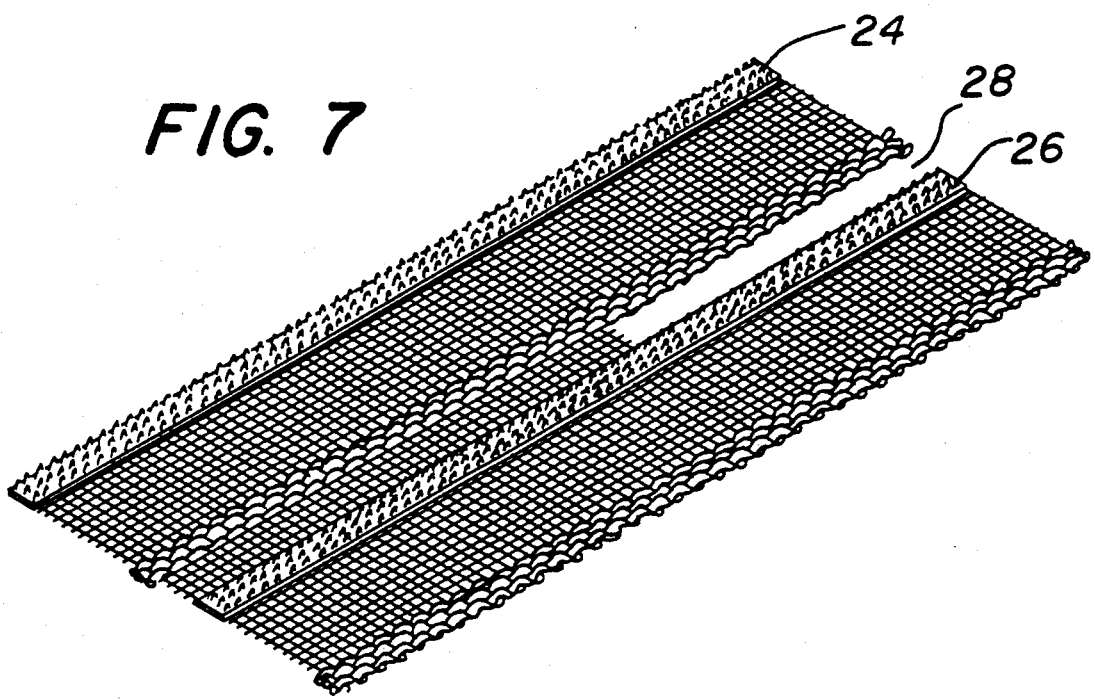
FIG. 7 illustrates a further alternative of the present invention.
Figure 8:
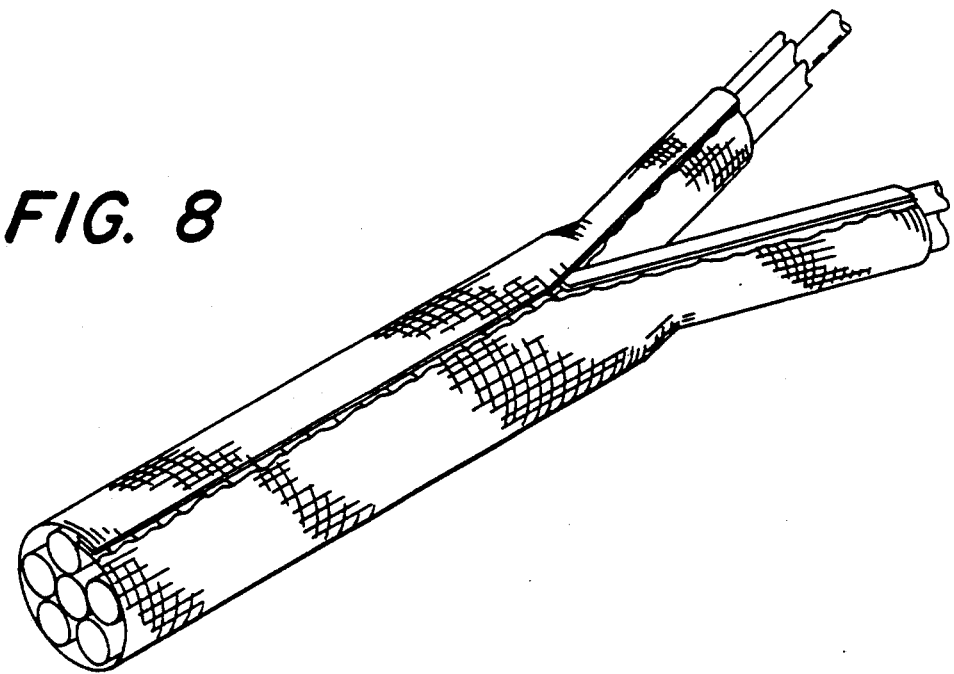
FIG. 8 illustrates the sleeving of FIG. 7 illustrating the a cable breakout utilizing the sleeving of FIG. 7.

Referring now to FIGS. 7 and 8, there is illustrated sleeving similar to FIG. 1 with interwoven warp yarns along one marginal edge of the sleeving and an additional two rows of wrap yarns spaced intermediate to the two marginal edges. Alternate rows shown at 24 and 26 are provided with Velcro hook type tape bonded thereto.

Utilizing the tape configuration of FIG. 7, the two marginal edges may be separated as required by cutting the web between the intermediate rows with a heat gun to the point where a cable breakout is required, as is shown by the reference character 28. The wraparound sleeving of FIG. 7 is shown as installed to accommodate a breakout in FIG. 8.

The characteristics of the multifilament yarn may vary widely and still accomplish the objectives of the present invention. Yarns formed of polypropylene of a cotton count of 1.1 s have proven to be particularly effective in applications where Velcro hook tape is employed. In general, the Velcro hook tape adheres more readily and firmly to the yarn as the yarn becomes more bulky. The effectiveness of any particular yarn may be readily determined by a few field trials.

In use in braided sleeving, additional multifilament warp yarns are provided in addition to the braided monofilaments. Braided sleeving may be formed on a circular braider and subsequently split lengthwise or flat braiding techniques may be employed.

What is claimed is:

1. A web for the formation of a wraparound sleeve for protecting elongated articles, said web being comprised of interlaced filamentary material;

said web having a first marginal edge having an array of individual hook type fastener means extending lengthwise thereof;

a second marginal edge extending parallel to the first, bulky multifilament warp yarn interlaced into said web along said second marginal edge;

said bulky multifilament warp yarns and said hook type fastener elements being interengageable to secure said marginal edges with the web in surrounding relationship to said elongated articles.

2. A web according to claim 1, said bulky multifilament warp yarn being exposed on the inner and the outer surface of said sleeve for joinder by the hook type fastener means alternatively with the inner web surface or the outer web surface.

3. A web according to claim 1 wherein said hook type fastener means comprises fastener hook tape secured along said first marginal edge.

4. A web according to claim 3 further including a row of bulky warp yarn interlaced with said monofilament ends along the first marginal edge with the yarn surface exposed on the surface opposite to the surface carrying the fastener hook tape.

5. A web according to claim 4 wherein said row comprises a plurality of individual multifilament warp yarns.

6. A web according to claim 5 further including at least one additional row of multifilament warp yarns spaced inwardly from said first named row of multifilament warp yarns.

7. A web according to claim 2 further including at least one row of bulky monofilament warp yarns spaced inwardly from the bulky monofilament warp yarn interlaced along said second marginal edge.

8. A web according to claim 7 wherein said web is a braided web.

9. A web according to claim 7 wherein said sleeve is a knitted web.

10. A web according to claim 7 wherein said web is a woven web.

11. A web according to claim 1 wherein said web is a woven web having monofilament wefts, the hook type fastener means comprising hooks formed integrally with the ends of the monofilament wefts exposed at the first marginal edge of the web.

12. A web according to claim 4, said web being wound into a roll form, the fastener means of said fastener hook tape and the said yarn surface along said first marginal edge being relatively positioned for interengagement whereby the web resists unrolling.

13. A sleeve for the protection of elongated substrates, said sleeve being comprised of interlaced filamentary material and having one marginal edge comprised of a band of bulky multifilament warp yarn exposed on both the inner and the outer surface of said sleeve and hook type fasteners extended along the opposite marginal edge of said sleeve, said hook type fasteners being interengageable with the bulky yarn for closure of the sleeve around the elongated substrates.

14. A sleeve according to claim 13, said sleeve having a second band of bulky yarn extended on the marginal edge having said hook type fasteners on the surface of the sleeve opposite to the surface having the fasteners, the sleeve being wound into a compact roll form with the hook type fasteners and bulky yarn yieldably holding the sleeve in said roll form.

* * * * *

UNITED STATES PATENT AND TRADEMARK OFFICE
CERTIFICATE OF CORRECTION

PATENT NO. : 5,178,923

DATED : January 12, 1993

INVENTOR(S) : Andrieu et al

It is certified that error appears in the above-identified patent and that said Letters Patent is hereby corrected as shown below:

Column 2, line 21, after "tieing;", as a separate paragraph, insert the words --the provision of a fastening means for a wraparound sleeve which readily accommodates breakout; and--

Column 2, line 22, after "means for a", insert --wraparound sleeve which eliminates the need for a--

Signed and Sealed this

Ninth Day of November, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,178,923
DATED : January 12, 1993
INVENTOR(S) : Andrieu, et al

It is certified that error appears in the above-indentified patent and that said Letters Patent is hereby corrected as shown below:

Col. 5, line 43, change "yarns" to --yarn--
Col. 5, line 44, change "elements" to --means--
Col. 6, line 5, change "with" to --into--
Col. 6, line 5, change "monofilament" to --web--
Col. 6, line 6, delete "ends"
Col. 6, line 22, change "sleeve" to web--

Signed and Sealed this

Fourth Day of November, 1997

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,178,923
DATED : January 12, 1993
INVENTOR(S) : Hubert Andrieu, et. al.

It is certified that error appears in the above-identified patent and that said Letters Patent is hereby corrected as shown below:

Col. 5, line 41, change "yarns" to --yarn--
Col. 5, line 42, change "elements" to --means--
Col. 6, line 5, change "with" to --into--
Col. 6, line 5, change "monofilament" to --web--
Col. 6, line 6, delete "ends"
Col. 6, line 22, change "sleeve" to --web--.

This certificate supersedes Certificate of Correction issued November 4, 1997.

Signed and Sealed this

Thirtieth Day of December, 1997

Attest:

BRUCE LEHMAN

*Attesting Officer*  *Commissioner of Patents and Trademarks*